US008795778B2

(12) United States Patent
Petcavich et al.

(10) Patent No.: US 8,795,778 B2
(45) Date of Patent: Aug. 5, 2014

(54) PHOTO-PATTERNING USING A TRANSLUCENT CYLINDRICAL MASTER TO FORM MICROSCOPIC CONDUCTIVE LINES ON A FLEXIBLE SUBSTRATE

(71) Applicant: Unipixel Displays, Inc., The Woodlands, TX (US)

(72) Inventors: Robert J. Petcavich, The Woodlands, TX (US); Ed S. Ramakrishnan, The Woodlands, TX (US); Daniel K. Van Ostrand, The Woodlands, TX (US)

(73) Assignee: Unipixel Displays, Inc., The Woodlands, TX (US)

( * ) Notice: Subject to any disclaimer, the term of this patent is extended or adjusted under 35 U.S.C. 154(b) by 0 days.

(21) Appl. No.: 13/979,627

(22) PCT Filed: Oct. 12, 2012

(86) PCT No.: PCT/US2012/059881
§ 371 (c)(1),
(2), (4) Date: Jul. 12, 2013

(87) PCT Pub. No.: WO2013/059078
PCT Pub. Date: Apr. 25, 2013

(65) Prior Publication Data
US 2014/0050896 A1 Feb. 20, 2014

Related U.S. Application Data

(60) Provisional application No. 61/548,909, filed on Oct. 19, 2011.

(51) Int. Cl.
*B05D 3/10* (2006.01)
*B05D 1/18* (2006.01)

(52) U.S. Cl.
USPC .......................... 427/304; 427/443.1

(58) Field of Classification Search
CPC .................... B29C 35/0888; B29C 35/0894
USPC ............. 427/304, 305, 306, 99.5, 443.1, 437
See application file for complete search history.

(56) References Cited

U.S. PATENT DOCUMENTS

| | | | |
|---|---|---|---|
| 5,759,473 A | 6/1998 | Minke et al. | |
| 5,993,702 A | 11/1999 | Davis | |
| 6,245,249 B1 | 6/2001 | Yamada et al. | |
| 6,632,342 B1 | 10/2003 | Teshima et al. | |
| 7,070,406 B2 | 7/2006 | Jeans | |
| 7,923,173 B1 | 4/2011 | Harris | |
| 7,973,997 B2 | 7/2011 | Lee | |
| 2002/0142143 A1 | 10/2002 | Schulz et al. | |
| 2004/0097072 A1* | 5/2004 | Carter et al. | 438/678 |
| 2006/0134562 A1 | 6/2006 | Chen et al. | |
| 2008/0213506 A1* | 9/2008 | Eu et al. | 427/595 |
| 2008/0229950 A1* | 9/2008 | Mei et al. | 101/375 |

(Continued)

OTHER PUBLICATIONS

PCT/US2012/059881 International Search Report and Written Opinion dated Feb. 20, 2013 (9 pgs.).

*Primary Examiner* — Dah-Wei D Yuan
*Assistant Examiner* — Nga Leung V Law

(57) ABSTRACT

A method includes forming a master embossing roller to have a predetermined pattern, coating a flexible unpatterned substrate with a catalyst coating layer and forming a corresponding pattern in the coated substrate using the master embossing roller to thereby form a patterned substrate. The method may also include electrolessly plating the patterned substrate.

13 Claims, 7 Drawing Sheets

(56) References Cited

U.S. PATENT DOCUMENTS

| | | |
|---|---|---|
| 2009/0020215 A1 | 1/2009 | Hood et al. |
| 2009/0263729 A1* | 10/2009 | Sinha ............................ 430/5 |
| 2009/0269705 A1 | 10/2009 | Kobrin |
| 2009/0297989 A1 | 12/2009 | Kobrin |
| 2009/0305513 A1 | 12/2009 | Kobrin |
| 2010/0035163 A1 | 2/2010 | Kobrin |
| 2010/0123885 A1 | 5/2010 | Kobrin |
| 2010/0282162 A1 | 11/2010 | Cho et al. |
| 2010/0310990 A1* | 12/2010 | Sato ............................ 430/320 |

* cited by examiner

1

PHOTO-PATTERNING USING A TRANSLUCENT CYLINDRICAL MASTER TO FORM MICROSCOPIC CONDUCTIVE LINES ON A FLEXIBLE SUBSTRATE

CROSS-REFERENCE TO RELATED APPLICATION

The present application claims priority to U.S. Provisional Patent Application No. 61/548,909, filed on Oct. 19, 2011 and titled "Using Roll-to-Roll Photo-Patterning Method Using a Translucent Cylindrical Master that Allows the Formation of High Definition, Microscopic Conductive Lines on a Polymer or Metal Flexible Substrate," which is hereby incorporated herein by reference.

BACKGROUND

Gartner anticipates touch screens (in Smartphones and midrange phones) to grow nearly 97% approaching 363 million units worldwide in 2010. By 2013 touch screens are expected to account for 58% of all mobile devices sold worldwide and more than 80% in the North American and Western European markets. Other market analysts anticipate that by 2015 there could be as many as 5 billion Smartphones in operation. In addition, the new tablet computers (such as the Apple iPad and Samsung Galaxy Tab) are gaining rapid acceptance with consumers. Apple is expected to sell 30 to 40 million iPads in 2011 and the Samsung Galaxy Tab has sold more than 1 million units since its release in November of 2010.

Resistive and capacitive touch screen technologies require materials that are both transparent and conducting to be functional. Indium Tin Oxide (ITO) is currently the most widely used metal oxide for touch screen sensor applications as it is optically transparent and is a fair conductor. ITO is commonly employed to make transparent conductive coatings for liquid crystal displays, flat panel displays, touch panels, solar panels and aircraft windshields. In resistive touch screens, when a user touches the screen with a finger or a stylus, the ITO film is pushed into contact with the ITO glass producing a voltage signal allowing a processor to compute the coordinates (X and Y) of the touch event and process the appropriate response to the touch point.

Although ITO is a mature and widely-used technology, it is not ideal. The main issues with ITO are the limited supply and the rising cost of indium. The supply issue is exacerbated by the fact that indium is a rare earth metal and is nearly exclusively controlled by the government of China. Other drawbacks associated with ITO have to do with the vapor deposition manufacturing process, which is expensive and cumbersome. The material itself is fragile and lacks flexibility and, compared to copper, indium is a relatively poor conductor. As a result, for more than a decade researchers have spent millions of dollars seeking a better and more cost-effective alternative. Some of these research efforts to find a transparent conductor have included the use of materials such as carbon nano-tube conductive coatings, thin metal films, conductive polymers (ICPs), and aluminum zinc oxide (AZO). To date, all of these materials have demonstrated significant disadvantages to ITO and are not currently commercially viable options.

In addition to the limitation of the ITO element, electrode patterns in touch sensors can only be printed at certain dimensions or resolution, specifically only electrode pattern structures above 25 microns are supported by current printing technologies.

SUMMARY

In some embodiments, on an outer surface of a hollow cylinder, which is transparent to UV wavelengths, a thin layer of material is coated and patterned (with laser or other photo-lithography method). The patterned layer is opaque to the UV light source contained within the cylinder. When the cylinder roller is placed in contact with the roll to roll film (as it passed by), the UV sensitive coating layer on the film is exposed to the pattern by the UV light source from within the cylinder. The electroless catalyst in the exposed area of the film is then the only part of the surface of the film that attracts the electroless metal during the metallization process.

In one embodiment, a method may include forming a master embossing roller to have a predetermined pattern, coating a flexible unpatterned substrate with a catalyst coating layer and forming a corresponding pattern in the coated substrate using the master embossing roller to thereby form a patterned substrate. The method may also include electrolessly plating the patterned substrate.

In another embodiment, a method may include coating a cylindrical structure with an ultraviolet light-opaque coating, laser etching a plurality of grooves in the coating to form a master embossing roller having a predetermined pattern of grooves and raised lines, and coating a flexible unpatterned substrate with a catalyst coating layer. The method may also include rotating the master embossing roller against the catalyst coating layer to form a pattern in the coated substrate corresponding to the grooves and lines of the mater embossing roller and electrolessly plating the patterned substrate.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

The term "about" or "approximately" means plus or minus 10%.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

An example of a technique is described in which an embossing roller is formed. The embossing roller is formed to comprise a pattern on its outer surface using, for example, a laser etching technique. The embossing roller then is used to form a specific pattern (e.g., the reverse image of the pattern formed on the roller itself) on a flexible substrate. In general, the substrate is coated with a catalyst material. The previously formed embossing roller is then used to imprint a specific pattern in the catalyst material. The imprinted catalyst material is plated (preferably electrolessly) with a conductive material and then cleaned.

Master Embossing Roller Formation

Figure 1:
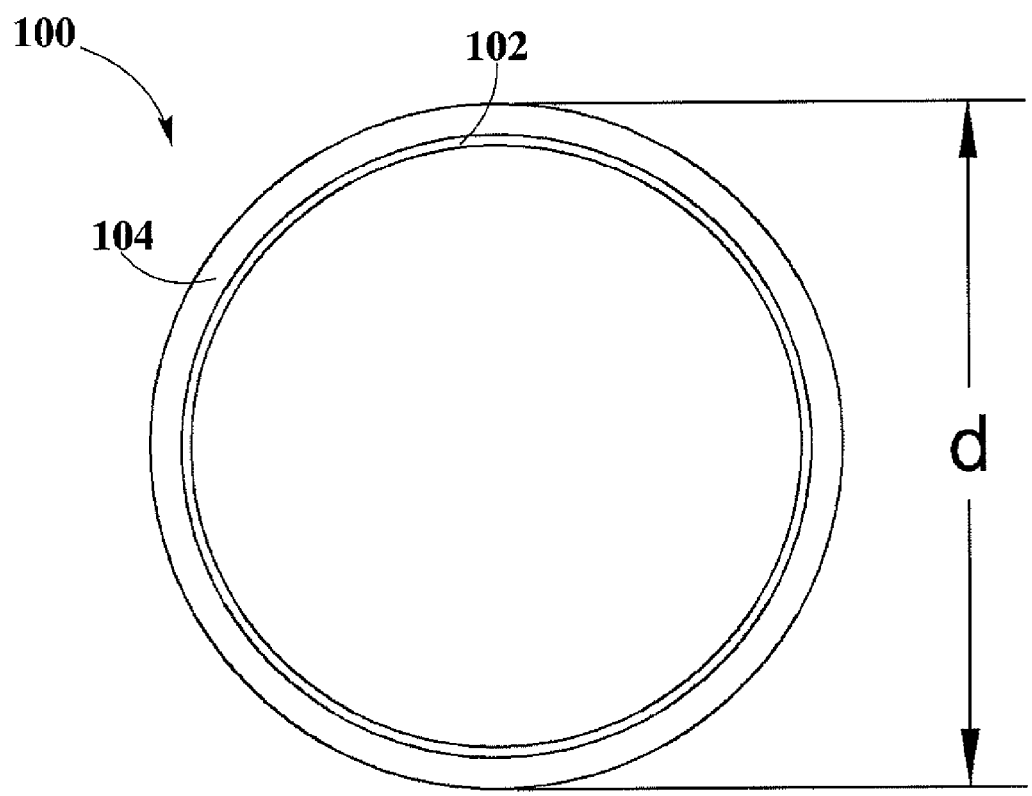
FIG. 1 illustrates the structure of the translucent quartz cylinder with a black resist coating coated around the structure.

The following discussion explains how an embossing roller may be formed. FIG. 1 shows an end view of a hollow cylinder structure 100. In some embodiments, the cylinder structure is formed from a material that is translucent to ultraviolet (UV) light. A suitable example of such a material is quartz, but other materials can be used as well. The cylinder structure 100 also is coated with a black resist coating 104. The black resist coating preferably is not a photoresist, but is a material which, once patterned, is opaque to UV light. The black resist coating 104 acts as a thermo-energy layer and over the cylinder structure 100 to a thickness of microns. An example of a suitable black resist material includes a positive or negative resist into which has been added either an organic or inorganic pigment to render it opaque. The resist can be applied by dip, spray, or ring coating techniques. The cylinder structure 100 with the black resist 104 layer can have a diameter (d) in a range from about 3 to 24 inches. A suitable thickness of the black resist coating 104 is between 0.5 and 25 microns in some embodiments.

Figure 2:
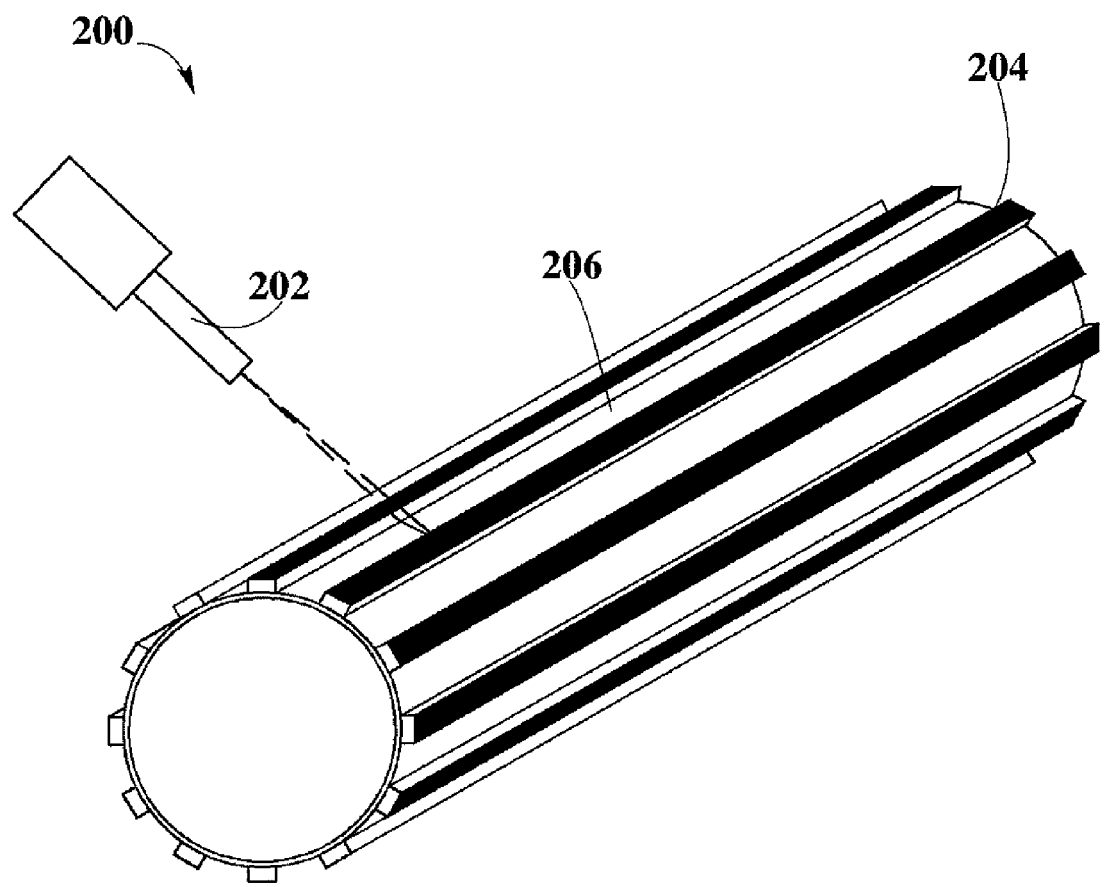
FIG. 2 depicts the engraving of a thin microstructure pattern on the translucent quartz cylinder structure performed by a laser device in transverse direction.

FIG. 2 illustrates an application 200 of how a pattern is etched into the black resist coating 104. In the example of FIG. 2, a laser 202 engraves the resist coating to result in thin, raised patterned lines 204 in a transverse direction (I.e., along the lengthwise direction of the cylinder). The laser 202 may emit any suitable wavelength of light, and in some embodiments emits a green laser beam. In FIG. 2, the laser beam transversely engraves thin patterned lines 204 on the black resist coating 104 coating down to a resolution of about 2 microns. In some embodiments, the cylinder structure 100 is rotated (e.g., 1 to 500 rpm) and the laser is turned on and off synchronized with the cylinder rotation so that lines and patterns of any shape or orientation can be made. In other embodiments, the laser 202 may etch an exposed region 206 (e.g., groove) on a non-moving cylinder, then the cylinder is rotated relative to the laser approximately the width of a patterned line. The laser again etches another exposed region 206 down some or all of the length of the cylinder and the process repeats until all desired exposed regions are etched around the periphery of the cylinder. Thus, the black resist coating 104 is exposed and etched away at the locations that the laser beam contacts, thereby forming exposed regions 206 on the black resist coating 104. The resulting pattern can be of any shape. For high resolution patterned lines below 10 microns, green laser 202 beam preferably is employed. Power employed for the laser 202 application in transverse direction may range from about 1 mW to about 1000 mW, within wavelengths from about 280 nm to about 980 nm. In general, any suitable wavelength laser can be used as noted above.

Figure 3:
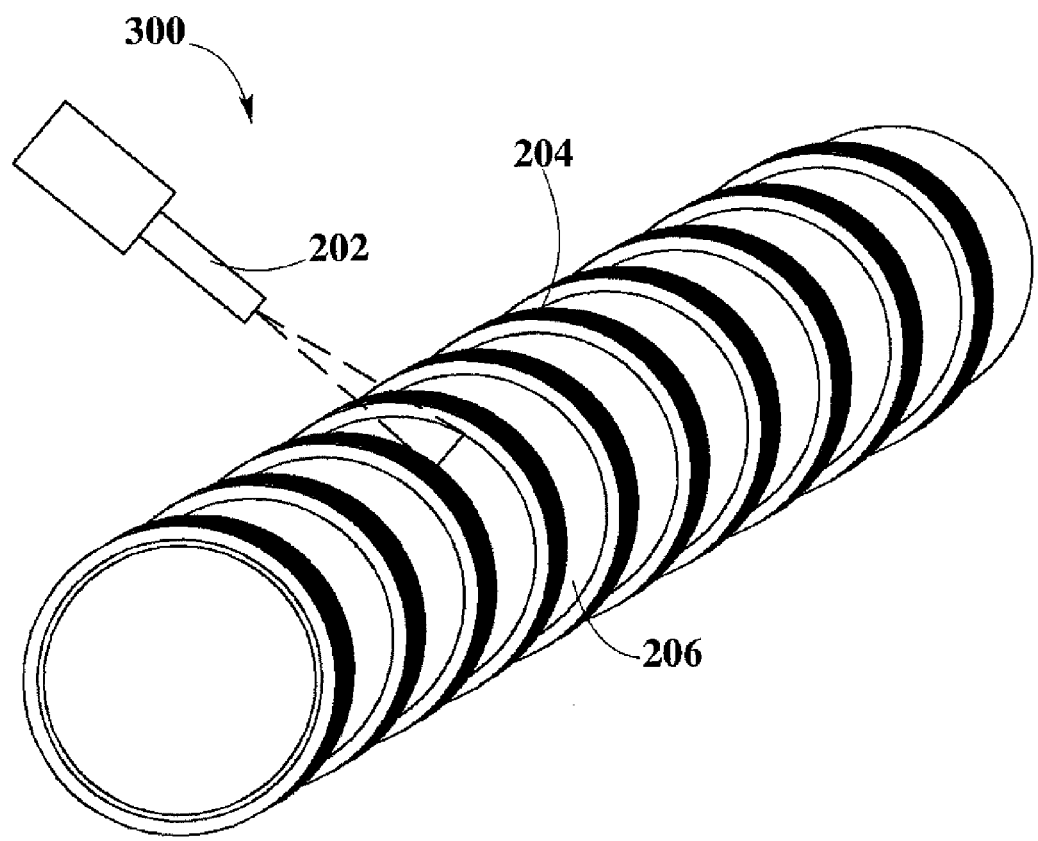
FIG. 3 depicts the engraving of a thin microstructure pattern on the translucent quartz cylinder structure performed by a laser device in machine direction.

FIG. 3 shows a laser application 300 in the "machine direction" (e.g., the direction in which the cylinder is rotated—in this case clockwise). The beam of light from laser 202 engraves thin patterned lines 204 circumferentially in the machine direction (or same direction as the clockwise rotation of the drum), down to a resolution of about 2 microns. In other embodiments, the thin patterned lines 204 may have some angle from 0 and 90 degrees with respect to a transverse axis (FIG. 2) or a circular cross section (FIG. 3), with a target control to avoid a moiré optical effect being between 17 to 22 degrees, depending on the frequency and size of the line. Power employed for the laser 202 application in machine direction may range from about 1 mW to about 1000 mW, within wavelengths from about 280 nm to about 980 nm, and preferably in the 400 nm to 500 nm wavelengths (green). The cylinder may rotate at a speed of 1 to 10,000 revolutions per minute (rpm) in this embodiment.

Figure 4:
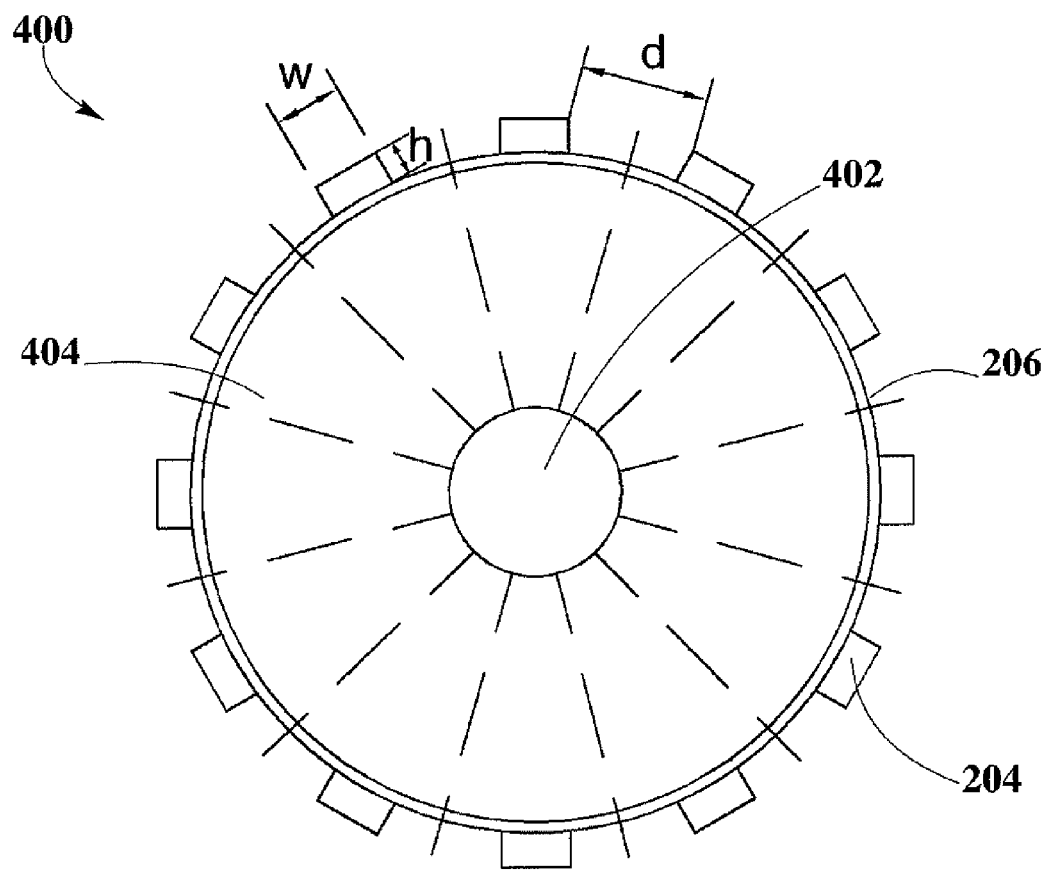
FIG. 4 is a top view of the master embossing roller with engraved microstructure pattern in transverse direction.

FIG. 4 depicts and end view of a master embossing roller 400 after the laser application 200 in the transverse direction. In FIG. 4, the exposed regions 206 of the black resist coating 104 forms thin patterned lines 204 on the surface of the master embossing roller 400. The distance (d) of the exposed regions 206 between the thin patterned lines 204 may be in the range of about 1 to 50 microns (or more) depending on the application. The height (h) and width (w) of the thin patterned lines 204 may be in the range of about 0.5 microns to 25 microns and 2 to 10 microns, respectively (depending on the application or pattern).

In some embodiments, the embossing roller may be coated with an aluminum coating layer just below the black resist coating 104 to protect the cylinder structure 100 from wearing during the etching process. Once the black resist coating 104 is patterned, a photoetch method may be used to selectively remove the aluminum coating layer in the exposed regions 206. Then, the remaining black resist 104 may be removed thereby resulting in a cylinder with aluminum patterned lines formed in a pattern corresponding to the pattern of the black resist coating 104 after it was laser etched.

In the center of the master embossing roller 400, a UV light source 402, may be placed to emit UV radiation 404 through the translucent quartz material 102 for catalyst chemical activation later in the process. Before the master embossing roller 400 can be used, an unpatterned substrate is first coated with a catalyst. The coating process is described below.

Coating Process

Figure 5:
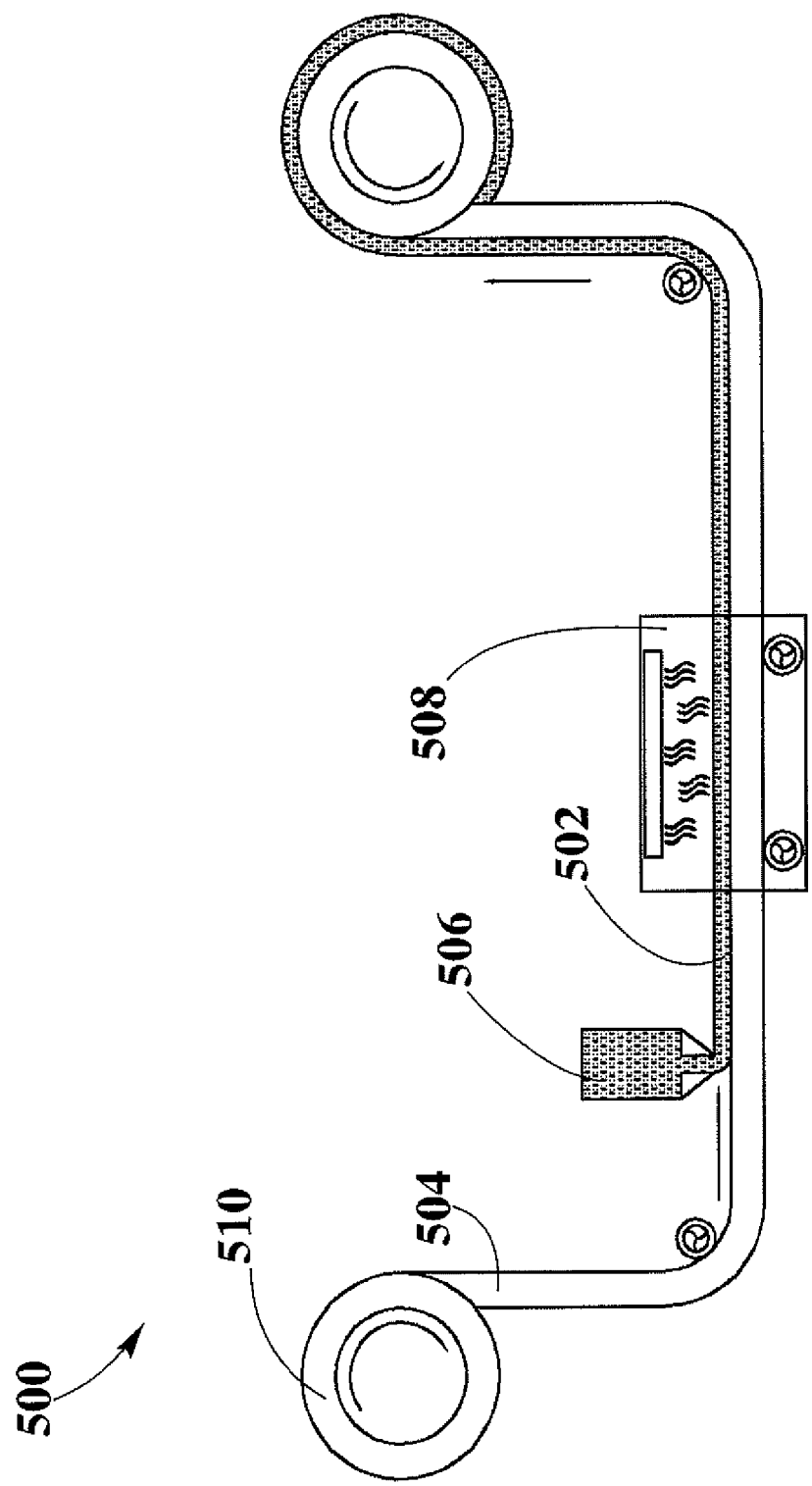
FIG. 5 illustrates the roll-to-roll coating application system comprising of a slot-die coating module and a drying module.

FIG. 5 shows a coating application system 500 that applies a catalyst coating material 502 onto a flexible unpatterned substrate 504. The system 500 includes a slot-die coating module 506 and a drying module 508 (preferably a theremo-drying module). The process depicted in FIG. 5 starts when slot-die coating module 506 accepts an unwound roll 510 of flexible unpatterned substrate 504. In general, materials that can be used for the flexible unpatterned substrate 504 include polyethylene terephthalate (PET) film, other polymer film, metal, paper, glass, etc. Specific examples of suitable materials for the flexible unpatterned substrate 504 may include the DuPont/Teijin Melinex 454 and Dupont/Teijin Melinex ST505, the latter being a heat stabilized film specially designed for processes where heat treatment is involved. For high definition applications, the surface of the flexible unpatterned substrate 504 film preferably is microscopically smooth, with thickness ranging from 12 to 250 microns.

In FIG. 5, the slot-die coating module 506 squeezes out the catalyst coating material 502 by pressure or gravity and onto the rolling or moving flexible unpatterned substrate 504, forming a precise, conformal catalyst coating layer 502 having a thickness, for example, in the range from 14 nanometers to 10 microns over the flexible unpatterned substrate 504. Materials that can be used for the catalyst coating 502 may include a combination of acrylics, urethane and polymers. Specifically, the catalyst coating 502 may be composed of an acrylic element within a concentration by weight of about 80% to 90% and which can be obtained from commercial providers such as Satomer, Radcuer, and Double Bond among others; a photo-initiator element within a concentration by weight of about 5% to 10% by weight supplied by Ciba Gelby; and a Palladium acetate element within a concentration by weight ranging from about 0.1% to 15%, with about 6% to 8% being preferred operating range.

The coating process can run at speeds from 10 (feet per minute (fpm) up to 1000 fpm, with target control in some embodiments being between 300 and 400 fpm, which allows for a more accurate control of viscosity and therefore thickness of the catalyst coating layer 502.

In other embodiments, the unwound roll 510 of flexible unpatterned substrate 504 may be replaced by another form of supply of flexible unpatterned substrate 504 for coating. For instance, flexible unpatterned substrate 504 may be supplied as flat sheets, in which case a sheet feeder mechanism may be implemented. In another example, flexible unpatterned substrate 504 may be supplied in fanfold form (e.g. like a folded, perforated stack of computer paper), wherein the flexible unpatterned substrate 504 is presented as substantially flat sheets that are periodically folded to form a zigzag pattern. In other embodiments, the flexible unpatterned substrate 504 may be cleaned prior the application of the catalyst coating layer 502. Furthermore, in other implementations, the catalyst coating layer 502 may be sprayed, rolled, brushed, or otherwise deposited onto the flexible unpatterned substrate 504.

After the coating process, in FIG. 5, the flexible unpatterned substrate 504 with the catalyst coating 502 on top preferably passes through the drying module 508 where heat radiation is applied within a preferred temperature range of about 50° C. to about 180° C. for a period of about 300 seconds, although the temperature and time can be different in other embodiments. In some implementations, the thermo-drying module 508 can dry or partially dry, heat, cure, or otherwise process the catalyst coating 502 that was applied to the flexible unpatterned substrate 504. The drying module may include a a UV radiation source to facilitate in the curing process. Furthermore, in other embodiments, by at least partly drying or curing the catalyst coating 502, it may become bonded to the flexible unpatterned substrate 504.

Micro-structure Embossing

Figure 6:
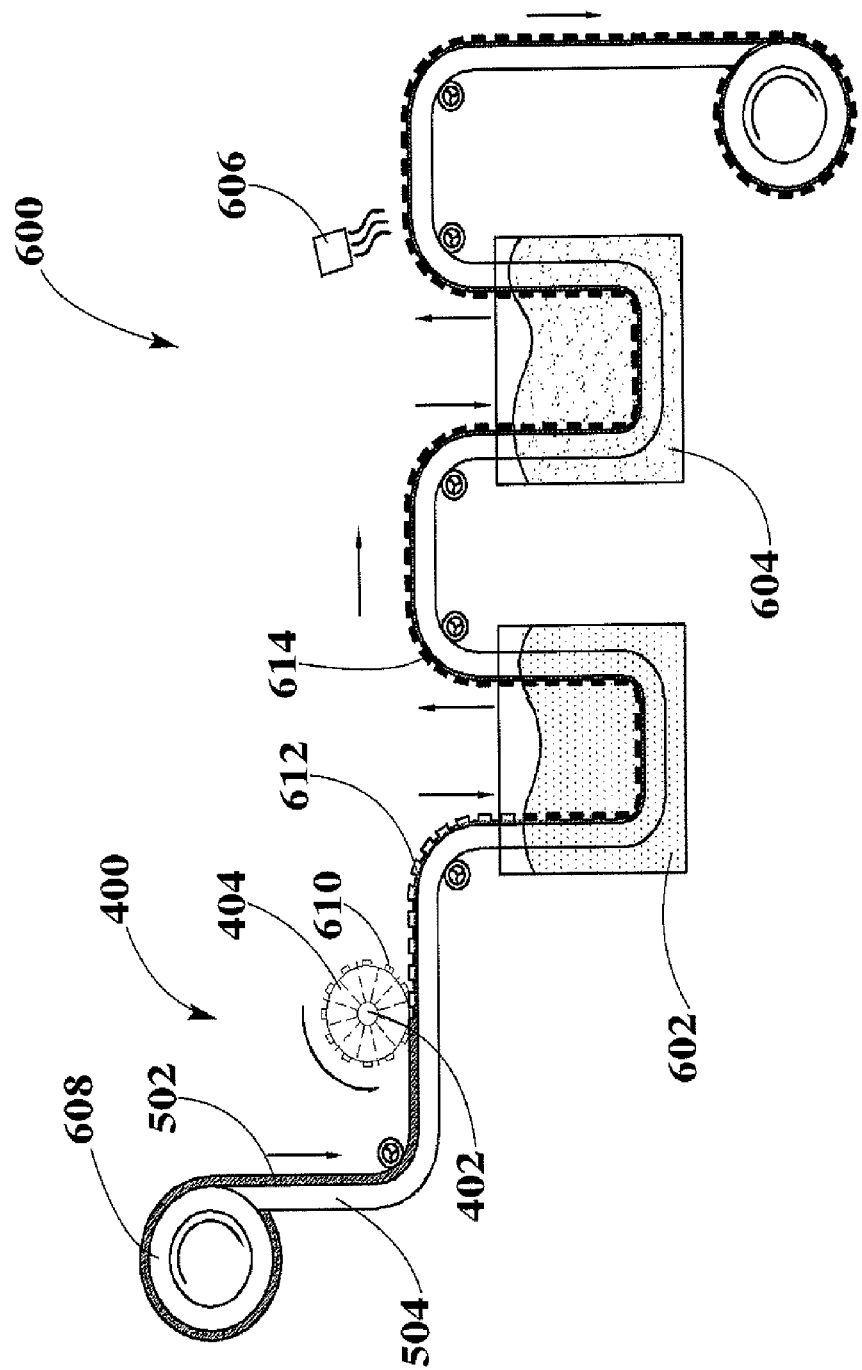
FIG. 6 depicts a microstructure embossing system that engraves thin pattern lines on a flexible film with a catalyst coating layer on top and consequently prints or plates conductive electrodes thin lines that can be any shape.

FIG. 6 illustrates the use of the master embossing roller 400 to form the desired pattern in the catalyst coating layer 502.

FIG. 6 illustrates an example of a microstructure embossing system 600. Various components of the system 600 include the master embossing roller 400, the plating tank 602, the cleaning tank 604, and the drying module 606. The embossing process starts when the master embossing roller 400 accepts an unwound roll 608 of flexible unpatterned substrate 504 with the catalyst coating layer 502 formed thereon as described above. As the master embossing roller 400 rolls over the catalyst coating layer 502 on top of the flexible unpatterned substrate 504, the microstructure pattern 610 is pressed into contact or near intimate contact with the catalyst coating 502. At the same time, during the embossing process, the UV light source 402 at the center of the master embossing roller 400 emits UV radiation 404 through the transparent quartz 102 material of the cylinder and activates the regions on the catalyst coating 502 that have been exposed by the UV radiation 404. As such, the embossing process simultaneously engraves a microstructure pattern 610 on the catalyst coating layer 502 and activates specific regions on the catalyst coating layer 502, forming the patterned catalyst electroplating precursor structures 612 which are ready to be plated (described below). The speed of the embossing process may be in the range of about 50 fpm to 300 fpm, with speeds between 50 and 100 fpm being preferred. For proper activation of the catalyst coating 502 regions, the speed of the embossing process preferably matches the affluence of the UV radiation 404, with target intensities in a range from about 0.5 mW/cm2 to about 50 mW/cm2, and a wavelength from about 280 nm to about 980 nm. The embossing process preferably has a speed of from 50 FPM to 1000 FPM, and in some embodiments, between 200 and 300 FPM.

Electro-less Plating

The process continues as depicted in FIG. 6 when the patterned catalyst electro-plating precursor structures 612 are submerged into the plating tank 602 that contains copper (or other suitable metal) in a liquid state at a temperature range between about 20 and 90° C. (e.g., 80° C.). This electroless plating process does not require the application of an electrical current and only plates the catalyst electro-plating precursor structures 612 that were previously activated by the exposition to UV radiation 404 during the embossing process, thereby forming the plated electrode pattern structures 614. In other embodiments, nickel is used as the plating metal. The copper plating bath may include reducing agents such as borohydride or hypophosphite, which cause the plating to occur. The deposition rate is normally 10 nm per minute and within a thickness of about 0.001 microns to about 100 microns, depending on the speed of the web and according to the application. The plating thickness tends to be uniform compared to electroplating due to the absence of electric fields. Although electroless plating is generally more time consuming than electrolytic plating, electroless plating is well suited for parts with complex geometries and/or many fine features.

After the plating process, in FIG. 6, the plated electrode pattern structures 614 are cleaned by being submerged into the cleaning tank 604 that contains water at room temperature and are dried by the drying module 606 through the application of air at a flow-rate preferably of about 20 feet per minute and at room temperature. In another embodiment, a passivation step at room temperature between 20° C. and 30° C. in a pattern spray may be added after the drying step to prevent any dangerous or undesired chemical reaction between copper and water.

Final Product Film

Figure 7:
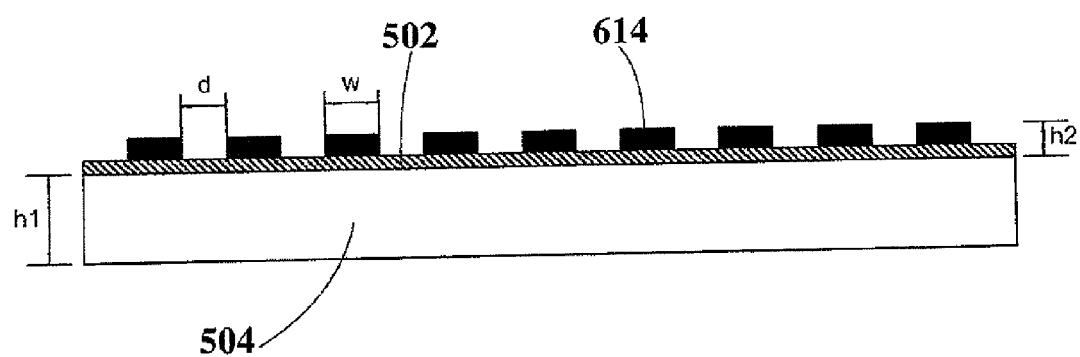
FIG. 7 is a side view of the flexible film substrate with the final microscopic plated electrode pattern on top.

FIG. 7 shows the side view of the final product film with the plated electrode pattern structures 614 in transverse direction.

The thickness (h1) of the flexible unpatterned substrate 504 may vary from about 10 microns to about 250 microns, while the thickness of the (h2) of the remaining catalyst coating 502 plus the plated electrode pattern structures 614 can have a range from about 150 nanometers to 5 microns, with 150 nanometers being the minimum thickness for plating. The width (w) of the plated electrode pattern structures 614 in the example of FIG. 7 may vary from about 0.5 microns to about 25 microns, with 3 to 5 microns being the optimal range to achieve a transparent effect from a reading distance. The spacing (d) between the plated electrode pattern structures 614 may vary from 1 micron to about 5 millimeters, depending of the resolution of the display. Resistivity of the plated electrode pattern structures 614 may vary from about 0.0015 micro ohms to about 500 ohms, depending on the application. The above described method produces a variance in the width of the plated electrode pattern structures 614 in the range of +/−1 micron.

In some embodiments, on an outer surface of a hollow cylinder, which is transparent to UV wavelengths, a thin layer of material is coated and patterned (with laser or other photolithography method). The patterned layer is opaque to the UV light source contained within the cylinder. When the cylinder roller is placed in contact with the roll to roll film (as it passes by), the UV sensitive coating layer on the film is exposed to the pattern by the UV light source from within the cylinder. The electroless catalyst in the exposed area of the film is then the only part of the surface of the film that attracts the electroless metal during the metalization process.

In other embodiments, the same hollow patterned cylinder as described above is used, however, the pattern is the inverse. In this case, the UV source is exposed to the areas of the film where metal is not desired. There is a range of UV dosage required to activate the catalyst. When the UV exposure exceeds this range, then the catalyst is 'poisoned' and does not attract the electroless metal. This method has a uniform exposure of the entire film surface followed with an over-exposure of the areas that should not contain any metal.

In yet other embodiments, a combination of embossing and UV patterning is performed in the same step. In this case, the patterned layer on the outside of the cylinder is created with a depth. The film is coated with an uncured resin (UV curable resin with the electroless catalyst included). When the film is pushed up against the hollow embossing cylinder, the UV exposure through the patterned 'channels' (or other pattern) not only cures the resin in that 3D shape, but also activates the catalyst contained within it. There is a subsequent 'cleaning' step to remove the uncured resin. Then the film is run through the same electroless metalization step as in the previous steps.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
    forming a master embossing roller comprising a predetermined pattern, wherein forming the master embossing roller comprises coating at least a portion of the roller with aluminum between an outer resist coating and a cylindrical substrate and photoetching portions of the aluminum not covered by the outer resist coating;
    coating a flexible unpatterned substrate with a catalyst coating layer;
    forming a corresponding pattern in the coated substrate using the master embossing roller to thereby form a patterned substrate; and
    electrolessly plating the patterned substrate.

2. The method of claim 1 wherein forming the corresponding pattern comprises rolling the master embossing roller relative to the flexible unpatterned substrate.

3. The method of claim 1 wherein forming the master embossing roller comprises etching away a portion of the outer resist coating from the cylindrical substrate.

4. The method of claim 3 wherein forming the master embossing roller comprises etching a portion of the outer resist layer using a laser.

5. The method of claim 1 wherein the catalyst coating layer comprises any one or more of acrylics, urethane and polymers.

6. The method of claim 1 wherein forming the master embossing roller comprises forming grooves in an outer resist layer that extend lengthwise the roller.

7. The method of claim 1 wherein forming the master embossing roller comprises forming grooves circumferentially in an outer resist layer on the roller.

8. The method of claim 1 wherein forming the master embossing roller comprises removing the outer resist coating thereby leaving those portions of the aluminum not photoetched away.

9. The method of claim 1 wherein the substrate comprises any one or more of polyethylene terephthalate (PET) film, metal, paper, and glass.

10. The method of claim 1 wherein electrolessly plating the patterned substrate comprises applying ultraviolet light to the substrate to selectively cause only some areas of the substrate to attract electroless metal.

11. A method, comprising:
    forming a master embossing roller comprising a predetermined pattern, wherein forming the master embossing roller comprises coating at least a portion of the roller with aluminum between an outer resist coating and a cylindrical substrate, photoetching portions of the aluminum not covered by the outer resist coating, and wherein forming the master embossing roller comprises removing the outer resist coating thereby leaving those portions of the aluminum not photoetched away;
    laser etching a plurality of grooves in the coating to form a master embossing roller having a predetermined pattern of grooves and raised lines;
    coating a cylindrical structure with an ultraviolet light-opaque coating;
    coating a flexible unpatterned substrate with a catalyst coating layer;
    embossing the predetermined pattern in the flexible unpatterned substrate by rotating the master embossing roller against the catalyst coating layer; and
    electrolessly plating the patterned substrate.

12. The method of claim 11 wherein laser etching comprises forming the grooves in a direction that extends along a long dimension of the cylindrical structure.

13. The method of claim 11 wherein laser etching comprises forming the grooves in a circumferential orientation on the cylindrical structure.

\* \* \* \* \*